United States Patent [19]
Lee

[11] Patent Number: 5,355,185
[45] Date of Patent: Oct. 11, 1994

[54] NOSE PAD-FREE EYE GLASS FRAME

[76] Inventor: Min S. Lee, 69-23, Kwangchun-Dong, Seo-Gu, Kwangju, Rep. of Korea

[21] Appl. No.: 65,230

[22] Filed: May 24, 1993

[30] Foreign Application Priority Data

Jun. 12, 1992 [KR] Rep. of Korea ............. 92-10428[U]
Jun. 12, 1992 [KR] Rep. of Korea ............. 92-10429[U]
Feb. 19, 1993 [KR] Rep. of Korea ..................... 93-2354

[51] Int. Cl.$^5$ ........................ G02C 3/00; G02C 9/00
[52] U.S. Cl. .................................. 351/63; 351/123; 351/156; 351/158; 24/3 C
[58] Field of Search ............... 24/3 C; 2/10, 11, 452; 351/41, 51, 52, 63, 66, 83, 111, 119, 122, 123, 131, 133, 155, 156, 157, 158

[56] References Cited

U.S. PATENT DOCUMENTS

| | | | |
|---|---|---|---|
| D. 129,119 | 8/1941 | Halikman | 351/155 X |
| 2,766,657 | 10/1956 | Nathan | 351/66 |
| 3,502,395 | 3/1970 | Wretman et al. | 351/156 |
| 4,515,449 | 5/1985 | Davidson | 351/156 |
| 4,549,793 | 10/1985 | Yoon | 351/156 |
| 4,630,321 | 12/1986 | Sagemuehl et al. | 2/426 |
| 4,688,272 | 8/1987 | Leonardi | 2/431 |
| 4,781,451 | 11/1988 | McAllen | 351/156 |
| 5,120,119 | 6/1992 | Mats | 351/157 |

FOREIGN PATENT DOCUMENTS

| | | | |
|---|---|---|---|
| 1456918 | 9/1966 | France | 351/156 |
| 0048218 | 3/1991 | Japan | 351/156 |

Primary Examiner—William L. Sikes
Assistant Examiner—David R. Parsons
Attorney, Agent, or Firm—Burns, Doane, Swecker & Mathis

[57] ABSTRACT

The eye glass frame is comprised of a pair of rims for receiving the lenses; side temples connected at one end to the outside edge of each rim, each side temple formed to rest behind the wearer's ears; and at least one supporting member attached to the side temple for securing the eye glass frame to the wearer's hair to properly position the lenses relative to the wearer's eyes. The glass frame may have several supporting members, which have several alternative configurations. That is, the supporting member may be comprised of at least one joint member attached to the side temple, and at least one head seating member formed at the free end of the joint member. The supporting member may be further comprised of at least one connecting member provided between the joint member and the head seating member. The head seating member has several alternative configurations.

8 Claims, 16 Drawing Sheets

NOSE PAD-FREE EYE GLASS FRAME

BACKGROUND OF THE INVENTION

The present invention relates to eye glass frames, and more particularly to novel nose pad-free eye glass frames capable of preventing the ridge of the wearer's nose from being compressed, which then leaves a visible skin impression caused by the nose pads of the conventional glass frame, and preventing the slipping down of the glasses on the wearer's nose caused by the weight thereof.

Generally, an eye glass frame includes a pair of lens rims, each of which receives one of two lenses, a pair of side temples, each connected at one end to the outside edge of its respective rims by means of a hinge and the other end of each temple formed in such manner as to rest behind the wearer's ears, and a pair of nose pads mounted at a specific position on the rims to prevent the glasses frame from slipping on the wearer's nose. In conventional eye glasses, a person wearing the glasses for a long time, is subjected to compress on the ridge of the nose by the weight of the glasses, thereby causing fatigue and a headache. Moreover, there is a problem in that the nose pads impress upon the wearer's nose an indented mark.

For the reasons described above, women like wearing contact lenses rather than eye glasses. Furthermore, there is another problem in that when the wearer's face becomes warm, for example when exercising or in warm weather, the eye glasses slip down the ridge of the wearer's nose due to the perspiration on the nose.

Many types of glass frames are disclosed in U.S. Pat. No. 4,688,272, U.S. Pat. No. 4,630,321 and etc. However, the glass frames according to the publications do not have improvements to solve the above-described problems.

SUMMARY OF THE INVENTION

It is an object of the present invention to provide a novel eye glass frame, which gives a good feeling to the wearer.

It is another object of the present invention to provide a novel eye glass frame without nose pads, thereby preventing the wearer's nose from being compressed and then having an impression on the nose.

It is still another object of the present invention to provide a novel eye glass frame which prevents the slipping down of the glasses on the wearer's nose.

The eye glass frame is comprised of a pair of rims for receiving the lenses; side temples connected at one end to the outside edge of each rim, each side temple formed to rest behind the wearer's ears; and, at least one supporting means attached to the side temple in the temple of the wearer for securing the eye glass frame to properly position the lenses for the wearer's eyes. The eye glass frame may have several supporting means, which have several alternative configurations. That is, the supporting means may be comprised of at least one joint member attached to the side temple in the wearer's temple area, and at least one head seating member formed at the free end of the joint member. The supporting means may be further comprised of at least one connecting member provided between the joint member and the head seating member. The head seating member has various kinds of inserting means for being inserted into a wearer's hair at its end.

These and other objects and advantages of the invention will be more fully understood when studied in connection with the description of the preferred embodiment.

DETAILED DESCRIPTION OF THE PREFERRED EMBODIMENTS

The present invention will now be explained in detail by referring to many preferred embodiments in conjunction with the accompanying drawings.

Figure 1:
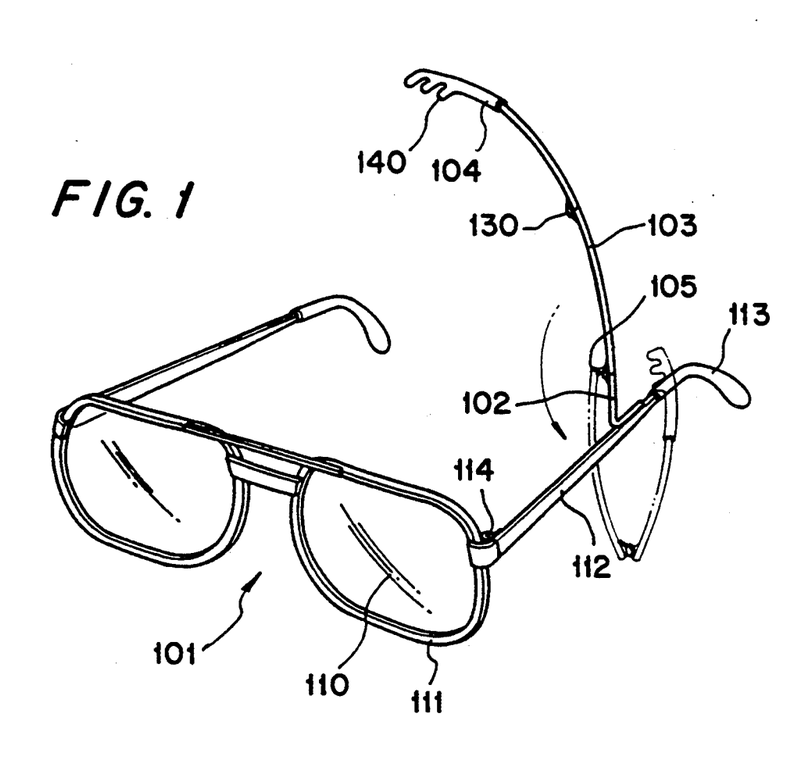
FIG. 1 is a perspective view of an unfolded eye glass frame according to the first preferred embodiment of the present invention.
Figure 2:
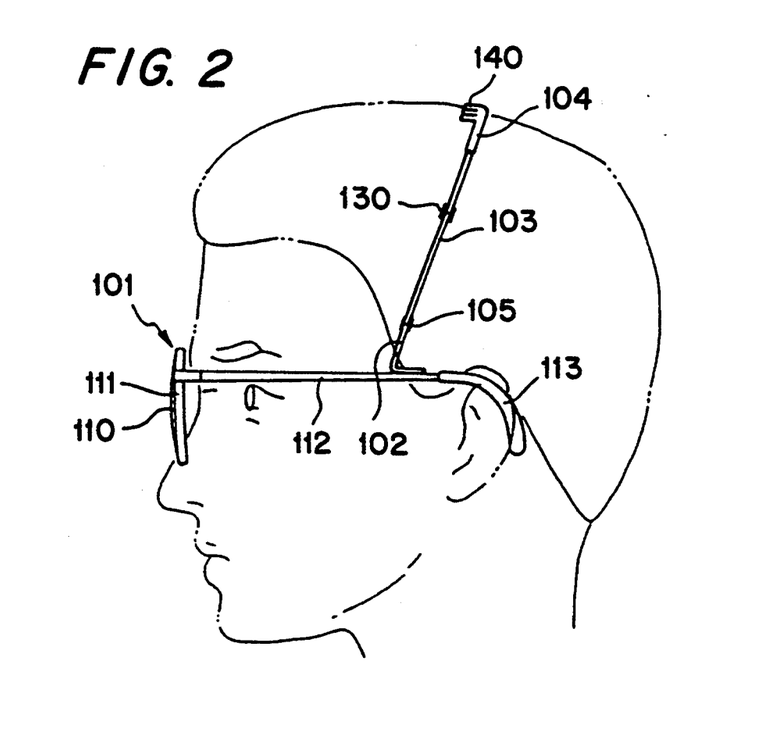
FIG. 2 is a side view showing the eye glass frame in use according to the first embodiment.

FIGS. 1 and 2 illustrate an eye glass frame according to the first embodiment. Referring to FIGS. 1 and 2, an eye glass frame 101 comprise a pair of rims 111 for receiving a pair of lenses 110, a pair of side temples 112 connected to the outside edges of the rims 111 by hinges 114, a pair of ear pad members 113 disposed on the free ends of the side temples 112, and a supporting means. The supporting means comprises an L-shaped joint member 102 attached to one of the side temples 112 in the wearer's temple area, a connecting member 103 attached to the free end of the joint member 102 by a hinge 105, and a head seating member 104 formed at the free end of the connecting member 103 by a hinge 130.

When a person wears the glasses, the lens rims 111 are kept spaced at a desirable distance from the wearer's eyes by the head seating member 104. A comb shaped member 140 as means for being inserted into the wearer's hair formed at the free end of the head seating member 104. The comb shaped member 140 is engaged with the wearer's hair. The connecting member 103 is made of either flexible plastic or bendable metal in order to maintain the balance of weight of the frame eye glass 101.

In the eye glass frame according to the first preferred embodiment, when the wearer wishes to remove and fold the glasses, the wearer initially folds the connecting member 103 by pressing a portion adjacent to the hinge 105, then folds the seating member 104 by pressing a portion adjacent to the hinge 130 again. In the manner described above, the eye glass frame 101 can be folded to occupy a smaller volume. When a person wears the glasses as shown in FIG. 2, the wearer can properly handle the comb shaped member 140 to insert it into his own hair and to adjust the lenses 110 to be secured at a suitable distance from his eyes.

Figure 3:
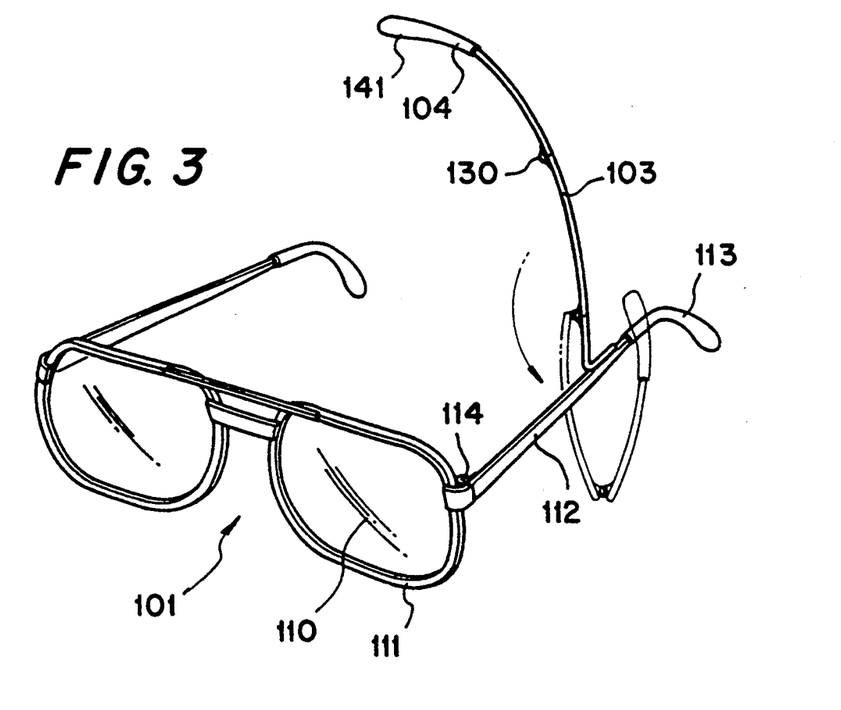
FIG. 3 .is a perspective view of an unfolded eye glass frame according to the second preferred embodiment of the present invention.
Figure 4:
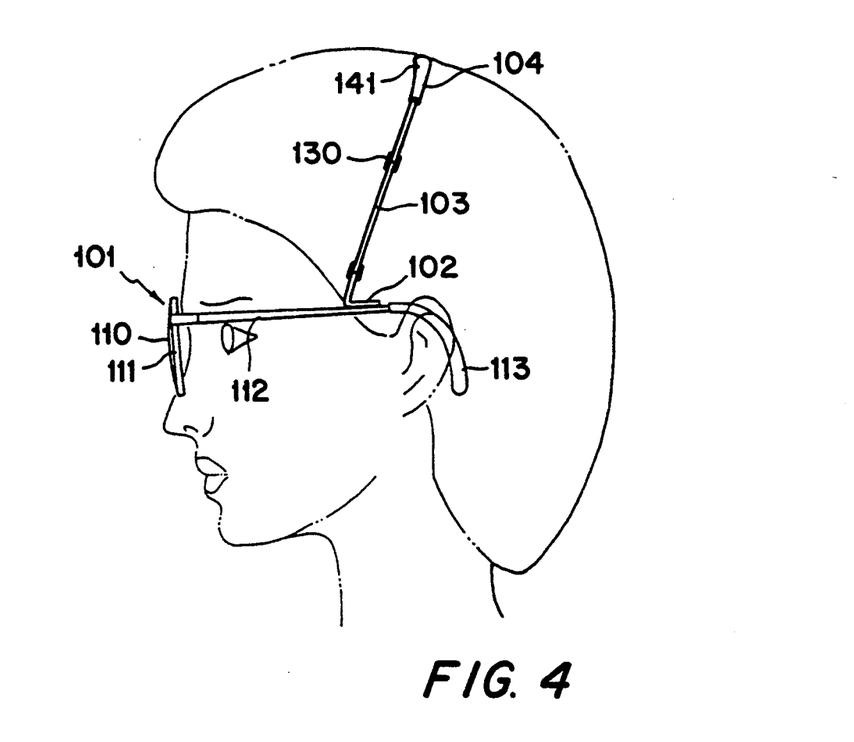
FIG. 4 is a side view showing the eye glass frame in use according to the second embodiment.

Referring to FIGS. 3 and 4 in which the eye glass frame according to the second embodiment is illustrated, a guide member 141 as restraint means instead of the comb shaped member 140, is formed at the free end of the head seating member 104. The eye glass frame 101 incorporating the guide member 141 is preferably used for women. For example, when a woman with permanently waved hair wears the glasses according to the second embodiment, the head seating member 104 is easily inserted into the woman's hair by the guide member 141.

Figure 5:
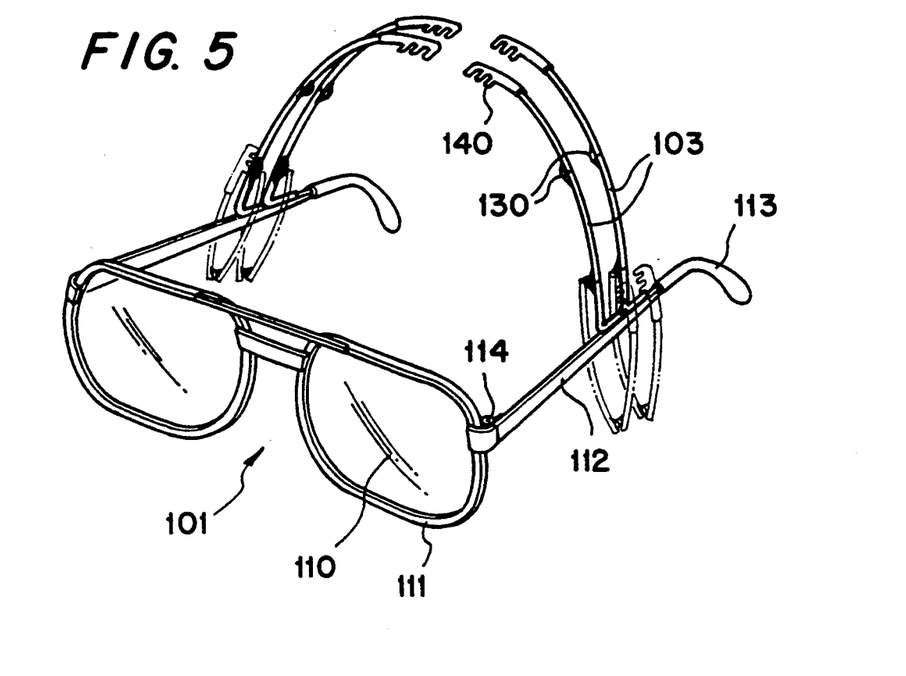
FIG. 5 is a perspective view of an unfolded eye glass frame according to the third preferred embodiment of the present invention.

Referring to FIG. 5 illustrating an eye glass frame according to the third embodiment, two sets of the joint members 102, the connecting members 103 and the head seating members 104 having the comb shaped member 140 according to the first embodiment are attached to one side temple 112 parallel with each other, and another two sets of the joint members 102, the connecting members 103 and the head seating members 104 having the comb shaped member 140 are attached to the other side temple 112 to face the two sets of the supporting means. The eye glass frame according to the third embodiment is preferably used for a person who is physically active, such as a sports man, because the eye glass frame 101 can be securely attached to the wearer's head by the four head seating members 104.

Figure 6:
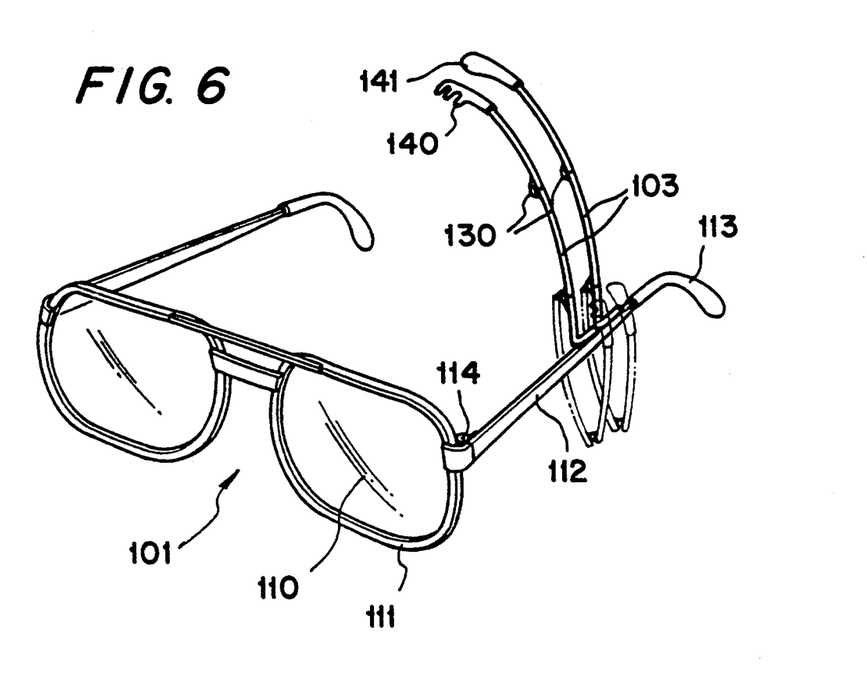
FIG. 6 is a perspective view of an unfolded eye glass frame according to the fourth preferred embodiment of the present invention.

Referring to FIG. 6 illustrating an eye glass frame according to the fourth embodiment, only two sets of supporting means comprising joint members 102, connecting members 103 and head seating members 104 are attached to either of side temples 112 parallel with each other. However, one head seating member 104 has a comb shaped member 140, while the other head seating member 104 has a guide member 141.

Figure 7:
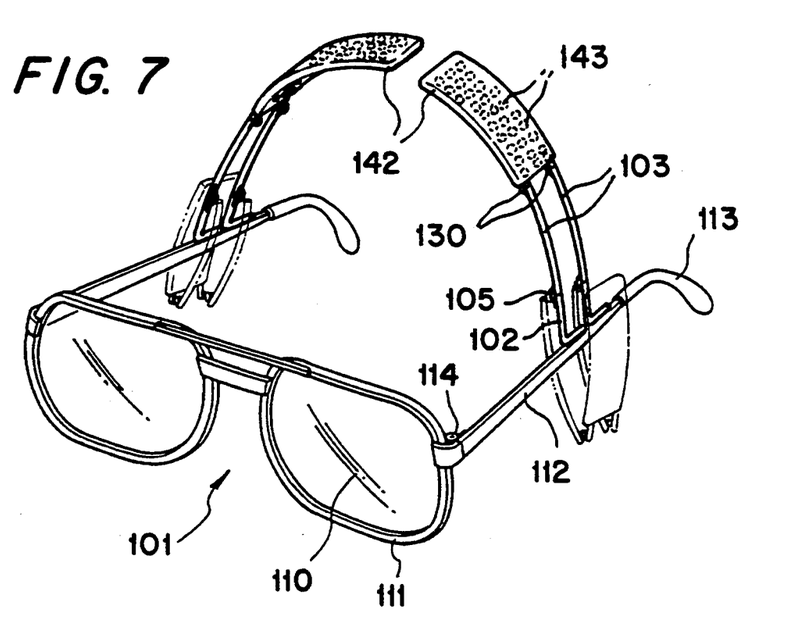
FIG. 7 is a perspective view of an unfolded eye glass frame according to the fifth preferred embodiment of the present invention.

Referring to FIG. 7 illustrating an eye glass frame according to a fifth embodiment, the eye glass frame 101 has two push plates 142 facing each other, instead of the head seating members 104 of the eye glass frame according to the third embodiment shown in FIG. 5. Each push plate 142 is attached to the free ends of the joint members 102;. which are disposed parallel with each other, by hinges 130. Numerous projections 143 are formed in interior of each push plate 142. When a person wears the glasses, the projections 143 of the push plates 142 grips the wearer's hair, thereby preventing the glasses from slipping down the wearer's head.

Figure 8:
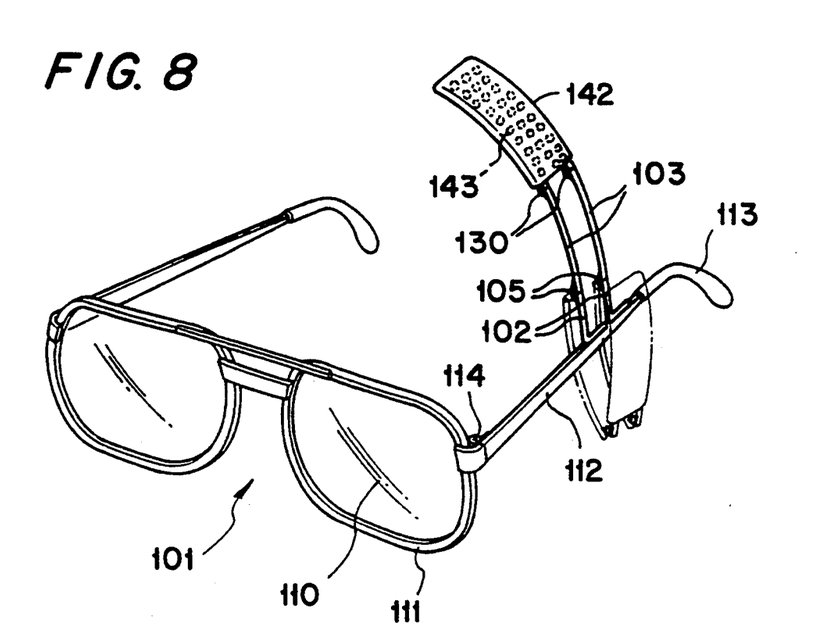
FIG. 8 is a perspective view of an unfolded eye glass frame according to the sixth preferred embodiment of the present invention.

Referring to FIG. 8 illustrating an eye glass frame according to a sixth embodiment, the eye glass frame 101 is the same as the fifth embodiment, except that it has only one supporting means having one push plate 142.

Figure 9:
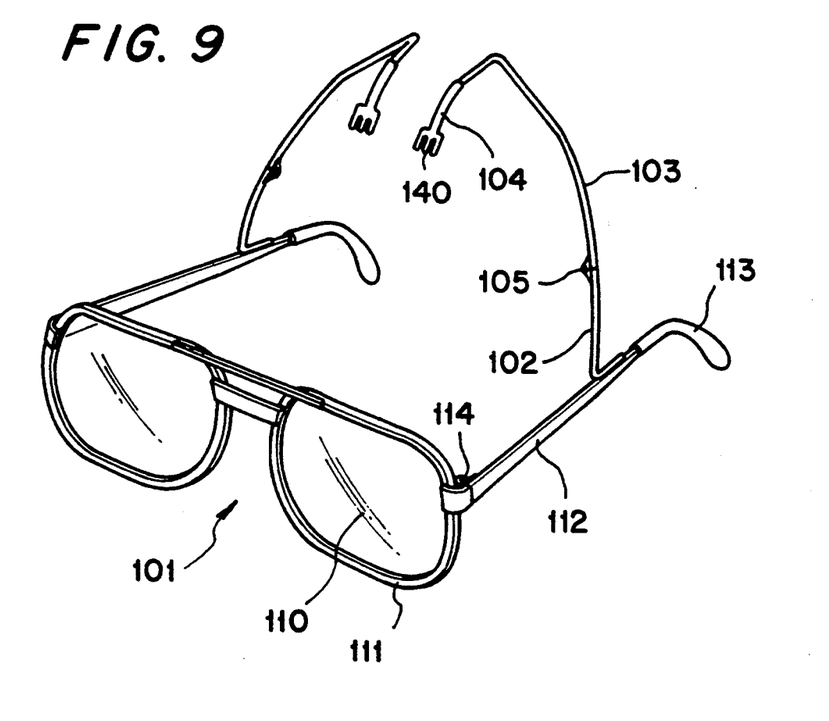
FIG. 9 is a perspective view of an unfolded eye glass frame according to the seventh preferred embodiment of the present invention.
Figure 10:
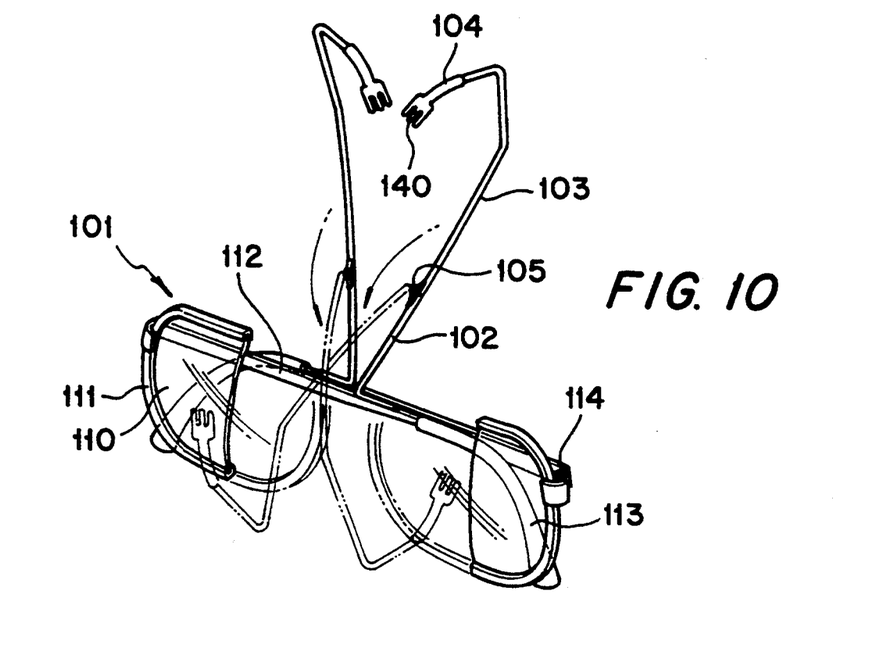
FIG. 10 is a perspective view of a folded eye glass frame according to the seventh embodiment.
Figure 11:
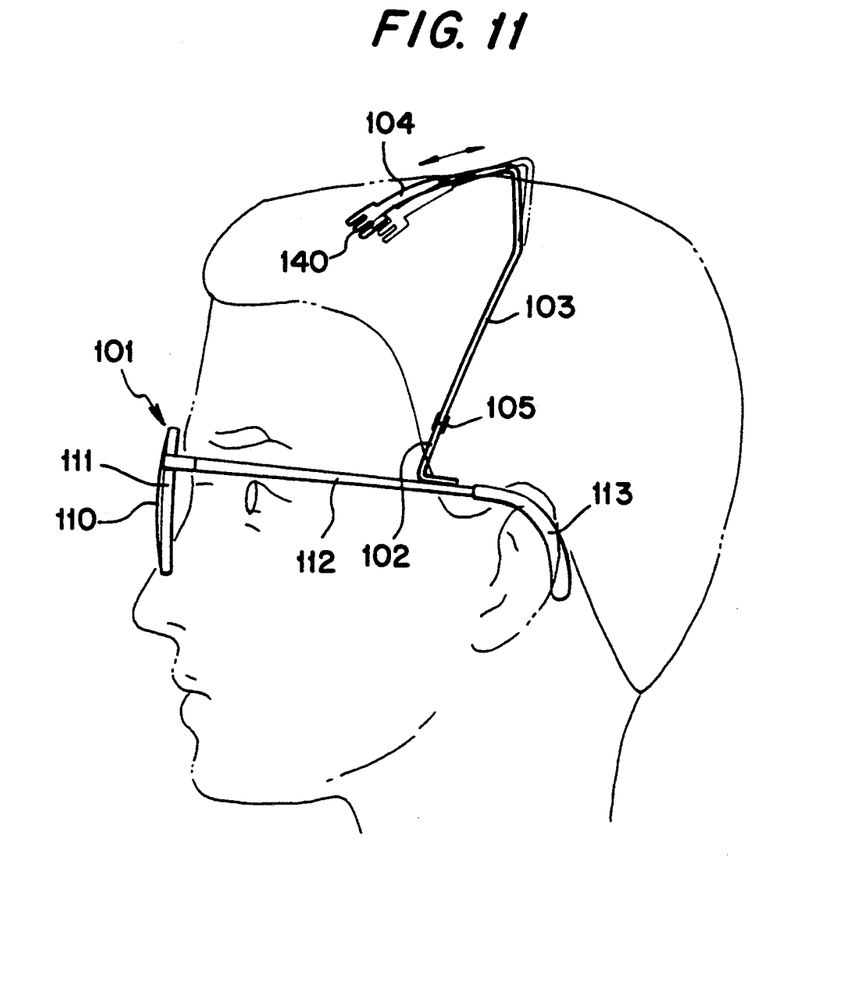
FIG. 11 is a perspective view showing the eye glass frame in use according to the seventh embodiment.

FIGS. 9 to 11 are related to an eye glass frame according to the seventh embodiment.

Referring to FIGS. 9 to 11, a connecting member 103 and a head seating member 104 are incorporated in one unit, without the use of hinge as in the first to fourth embodiments shown in FIGS. 1 to 6. The head seating member 104 incorporated with the connecting member 103 is preferably made of flexible materials, such as plastic, bendable metal or the like. Moreover, the two sets of the supporting means comprising the joint member 102 and the head seating member 104 incorporated with connecting member 103 are disposed in such manner as to face each other at the proper location on each side temple 112. A fork shaped member 140 serving as restraint means is formed at the free end of each head seating member 104. The eye glass frame can be used for everybody regardless of the differences in the shape and size of the wearer's head because of the configurations and materials used as described above. That is, the wearer can properly bend or stretch the head seating member 104 to suitably keep the glasses at a proper position from the wearer's eyes as shown in FIG. 11.

In FIG. 10, the imaginary line represents the .eye glass frame in a folded state.

Figure 12:
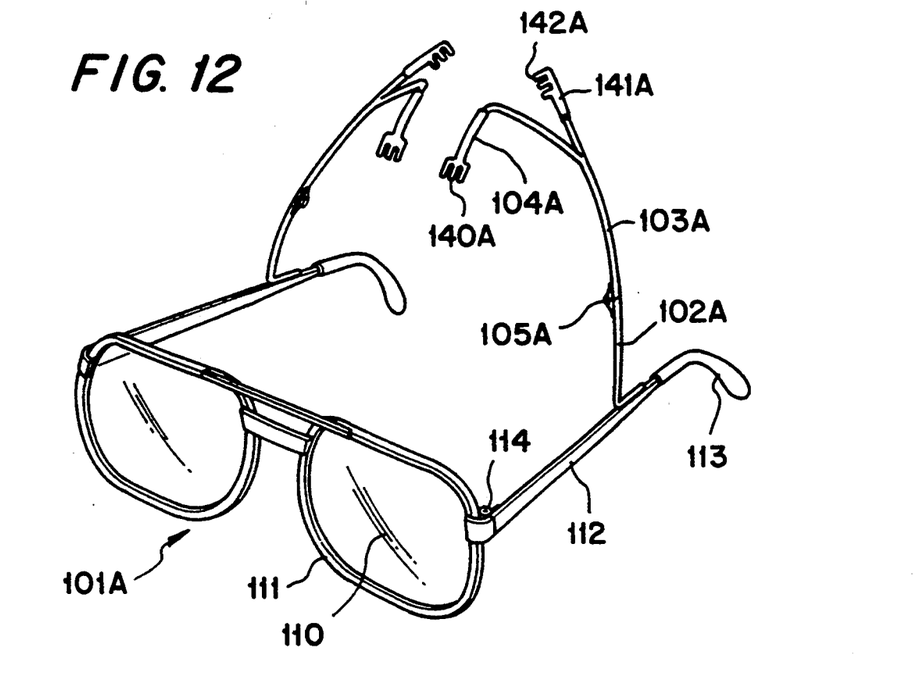
FIG. 12 is a perspective view of an unfolded eye glass frame according to the eighth preferred embodiment of the present invention.
Figure 13:
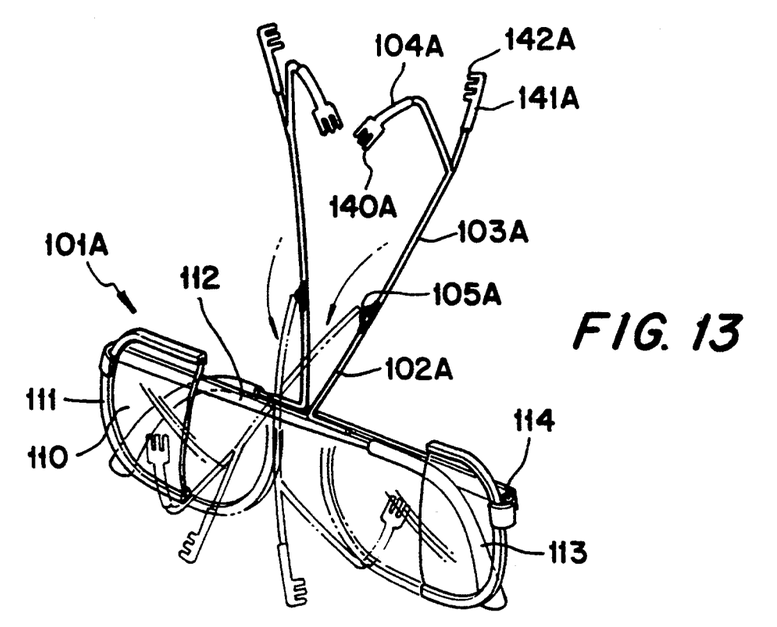
FIG. 13 is a perspective view of a folded eye glass frame according to the eighth embodiment.
Figure 14:
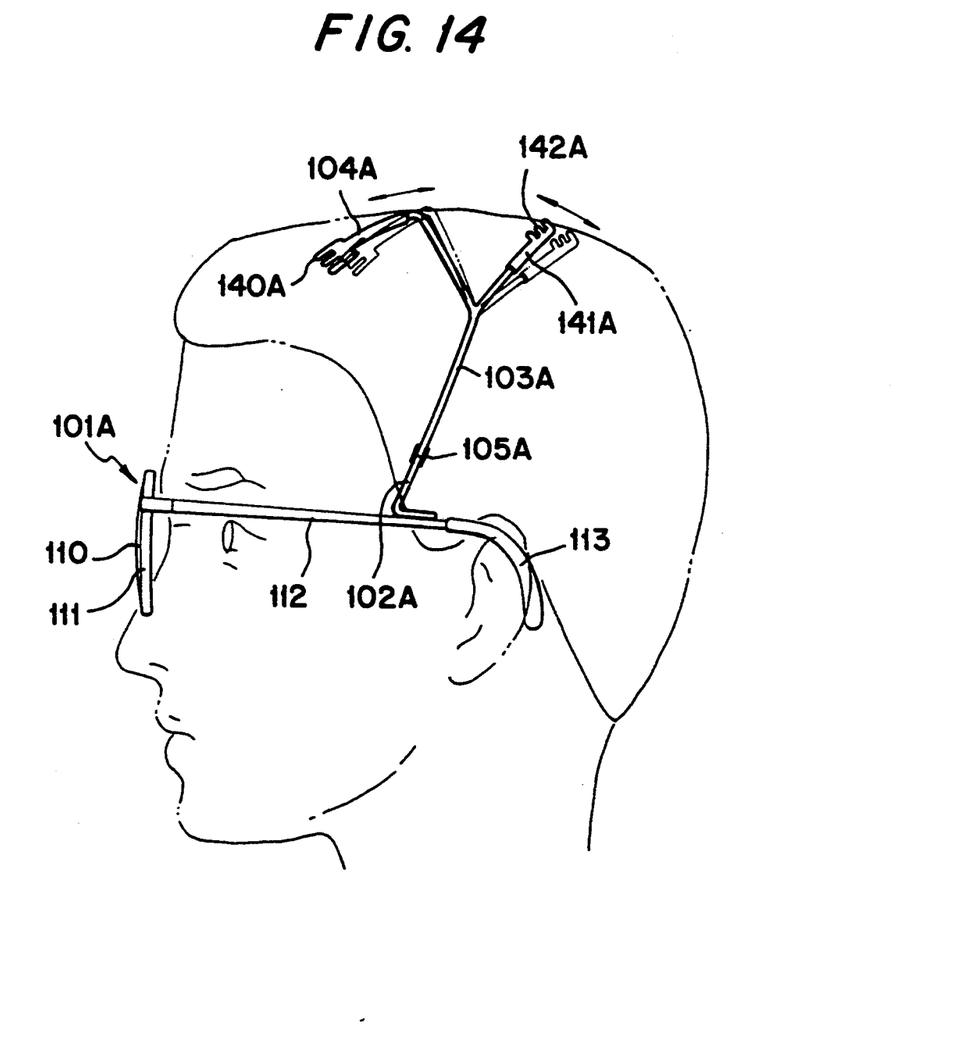
FIG. 14 is a side view showing the eye glass frame in use according to the eighth embodiment.

FIGS. 12 to 14 are related to an eye glass frame according to an eighth embodiment, which is the same as the seventh embodiment, except that a connecting member 103A branches off into a Y shape, and a head seating member 141A in one end of the connecting member 103A has a comb shaped member 142A and a head seating member 104A in the other end of the connecting member 103A has a fork shaped member 104A.

In FIG. 13, the imaginary line represents the eye glass frame in a folded state according to the eight embodiment.

The eye glass frame according to the eighth embodiment is preferable used for physically active persons, such as sports men, because the eye glass frame can be securely attached to the wearer's head by use of the several restraint members.

Figure 15:
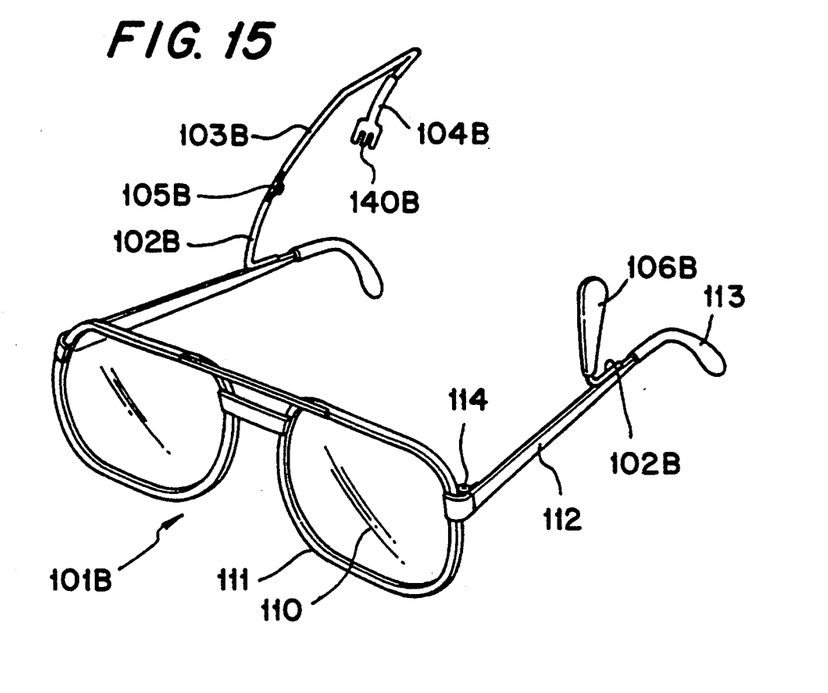
FIG. 15 is a perspective view of an unfolded eye glass frame according to the ninth preferred embodiment of the present invention.
Figure 16:
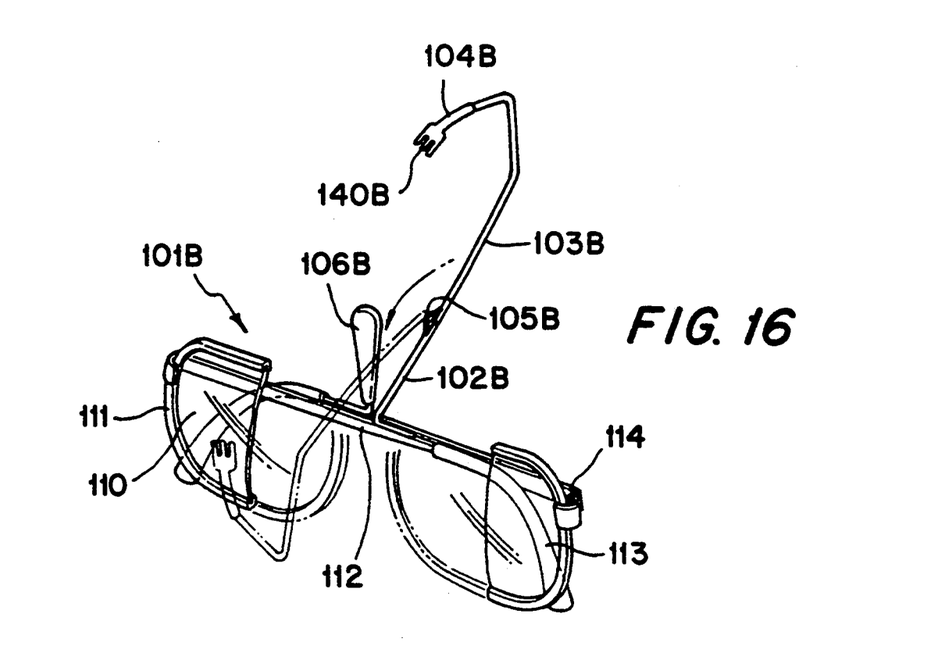
FIG. 16 is a perspective view of a folded eye glass frame according to the ninth embodiment.
Figure 17:
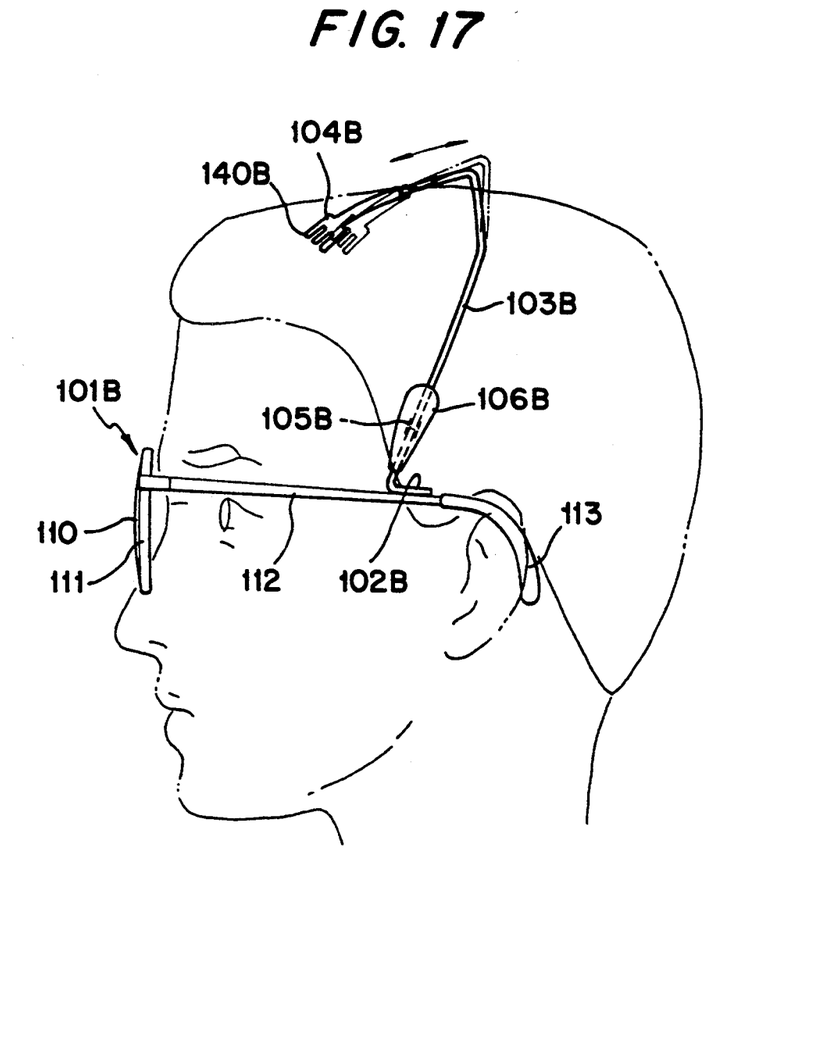
FIG. 17 is a side view showing the eye glass frame in use according to the ninth embodiment.

FIGS. 15 to 17 are related to an eye glass frame according to the ninth embodiment.

Referring to FIGS. 15 to 17, the eye glass frame has only one joint member 102B and a head seating member 104B incorporated with a connecting member 103B at a proper location on one side temple 112. An L-shaped joint member 102B is attached at the proper location on the other side temple 112. A guide member 106B is provided to enclose the upright portion of the joint member 102B. The guide member 106B can effectively prevent movement of the eye glass frame, which may be caused by providing the head seating member 104B to only one of the side temple 112.

Figure 18:
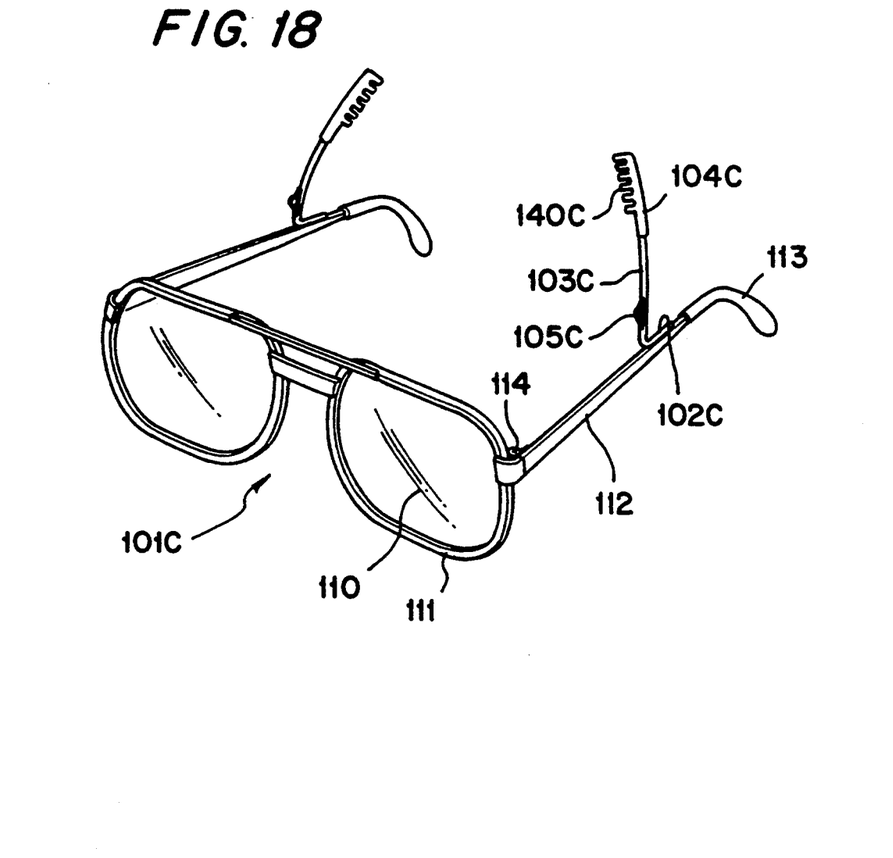
FIG. 18 is a perspective view of an unfolded eye glass frame according to a tenth preferred embodiment of the present invention.
Figure 19:
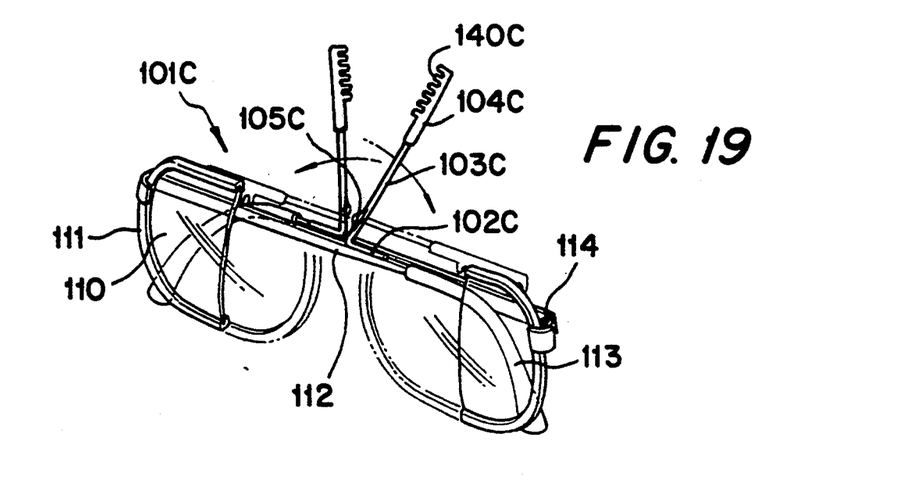
FIG. 19 is a perspective view of a folded eye glass frame according to the tenth embodiment.
Figure 20:
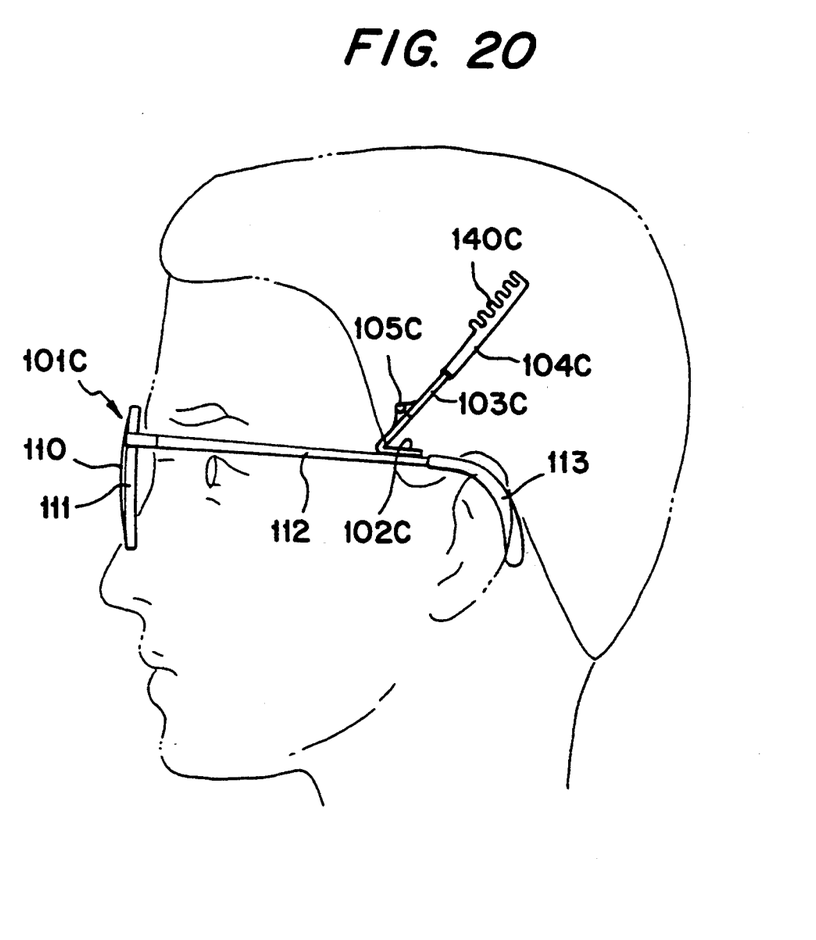
FIG. 20 is a side view showing the eye glass frame in use according to the tenth embodiment.

FIGS. 18 to 20 are related to an eye glass frame according to a tenth embodiment.

Referring to FIGS. 18 to 20, the eye glass frame has a set of a joint member 102C and a head seating member 104C incorporated with a connecting member 103C at a proper location on each of the side temple 112. A comb shaped member 140C is disposed on the free end of the head seating member 104C. The joint member 102C and the head seating member 104C incorporated with the connecting member 103C are coupled by a hinge 105C. In this embodiment, the respective lengths of the upright portion of the joint member 102, and head seating member 104C are shorter than those of the embodiments described above so that the comb shaped member 140C may be placed at the upper side of the wearer's head.

Figure 21:
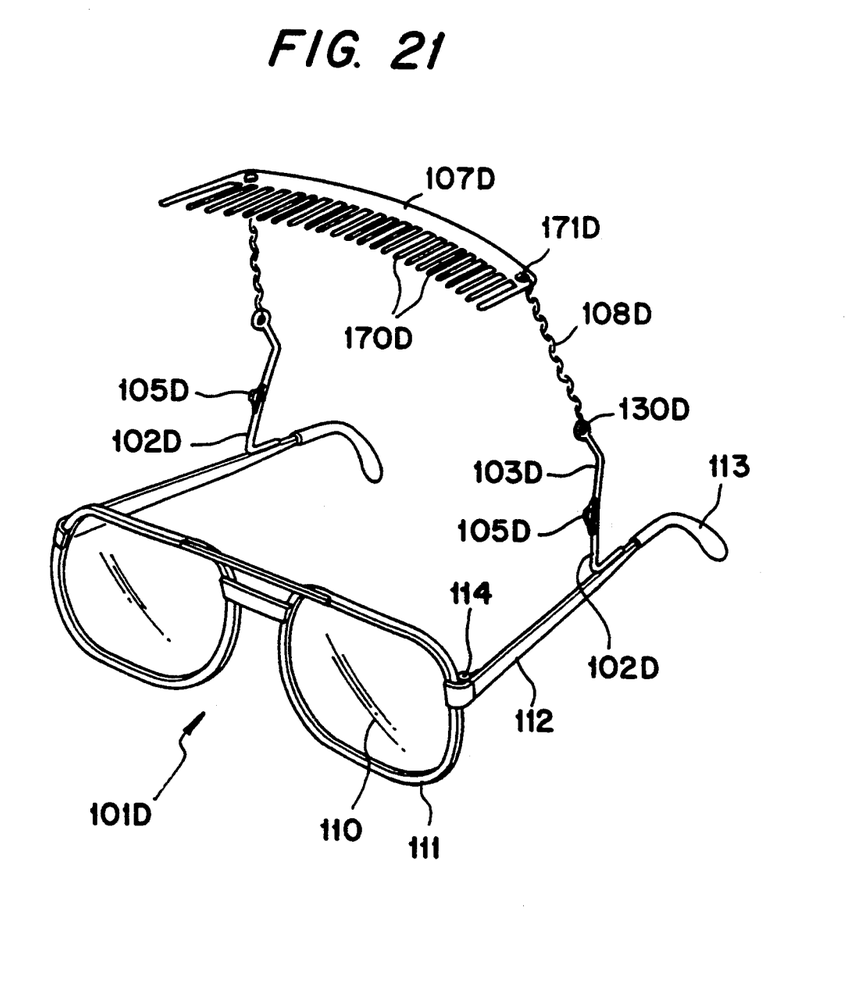
FIG. 21 is a perspective view of an unfolded eye glass frame according to the eleventh preferred embodiment of the present invention.
Figure 22:
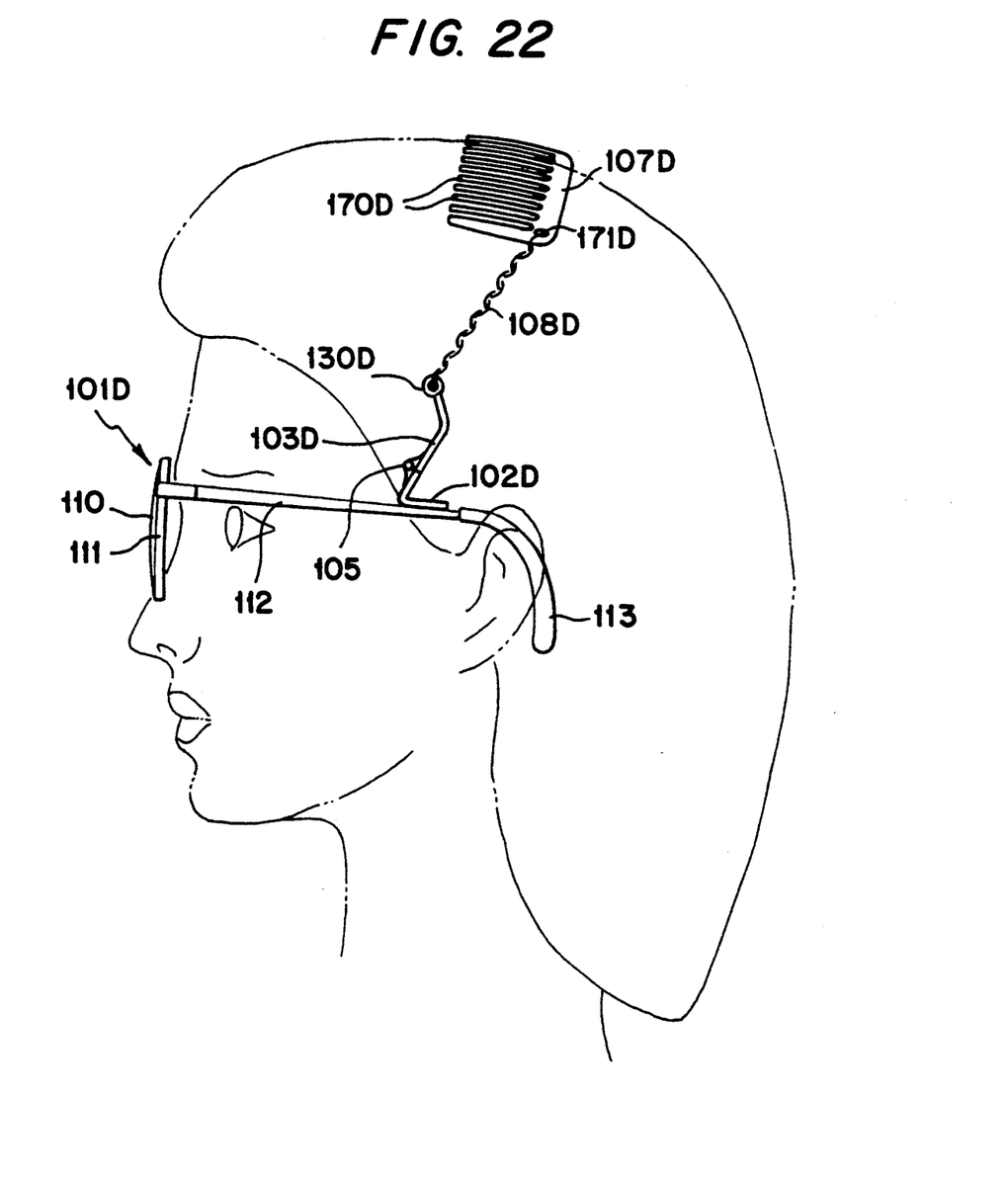
FIG. 22 is a side view showing the eye glass frame in use according to the eleventh embodiment.

FIGS. 21 and 22 are related to an eye glass frame according to the eleventh embodiment.

Referring to FIGS. 21 and 22, joint members 102D are attached to each of the side temples 112, and connecting members 103D are coupled to the joint members 102D by hinges 105D. Rings 130D are formed at the free ends of the connecting members 103D. Chains 108D, of a proper length, are connected to the rings 130D. A comb member 107D with holes 171D formed at both side ends thereof is connected to the chains 108D. The eye glass frame according to the eleventh embodiment is preferably used for women.

Figure 23:
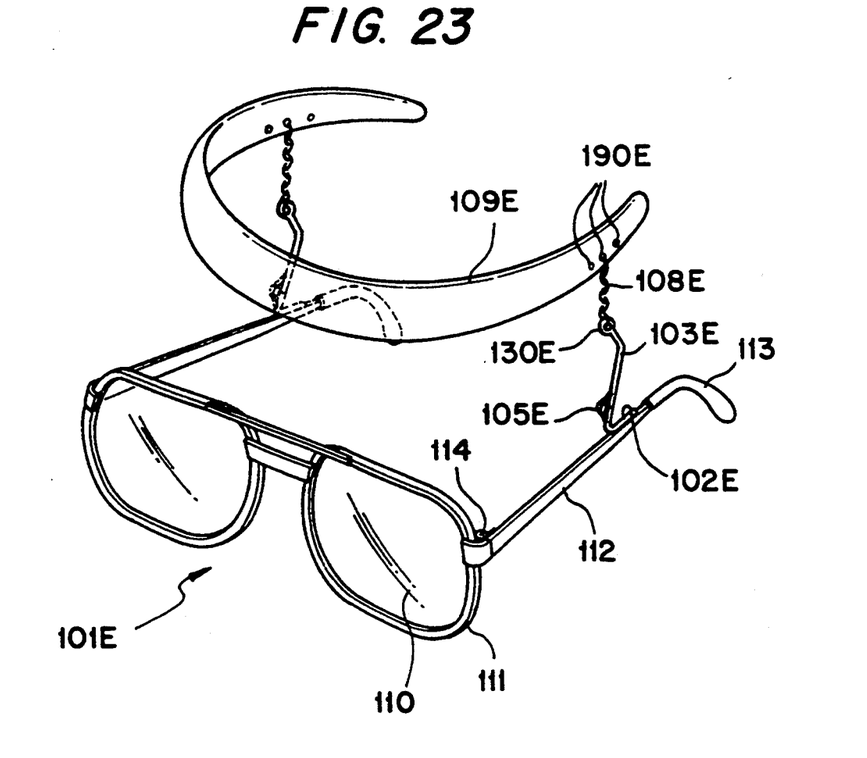
FIG. 23 is a perspective view of an unfolded eye glass frame according to the twelfth preferred embodiment of the present invention.
Figure 24:
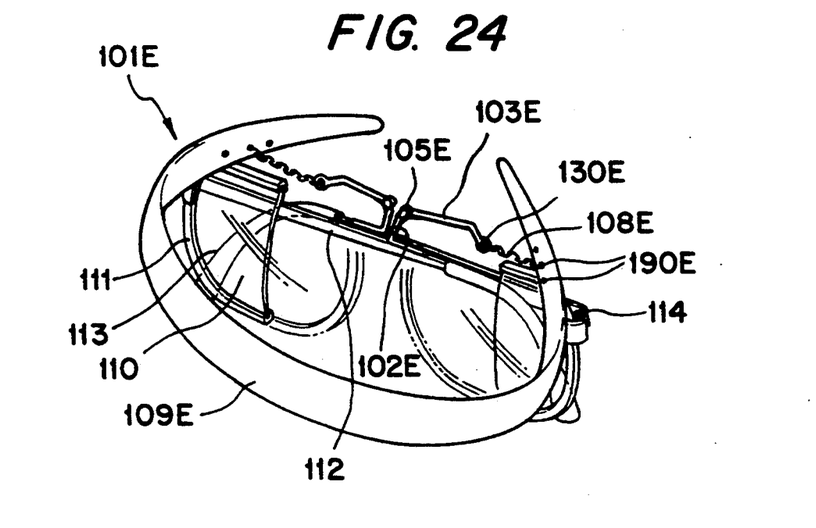
FIG. 24 is a perspective view of a folded eye glass frame according to the twelfth embodiment; and, FIG. 25 is a side view showing the eye glass frame in use according to the twelfth embodiment.
Figure 25:
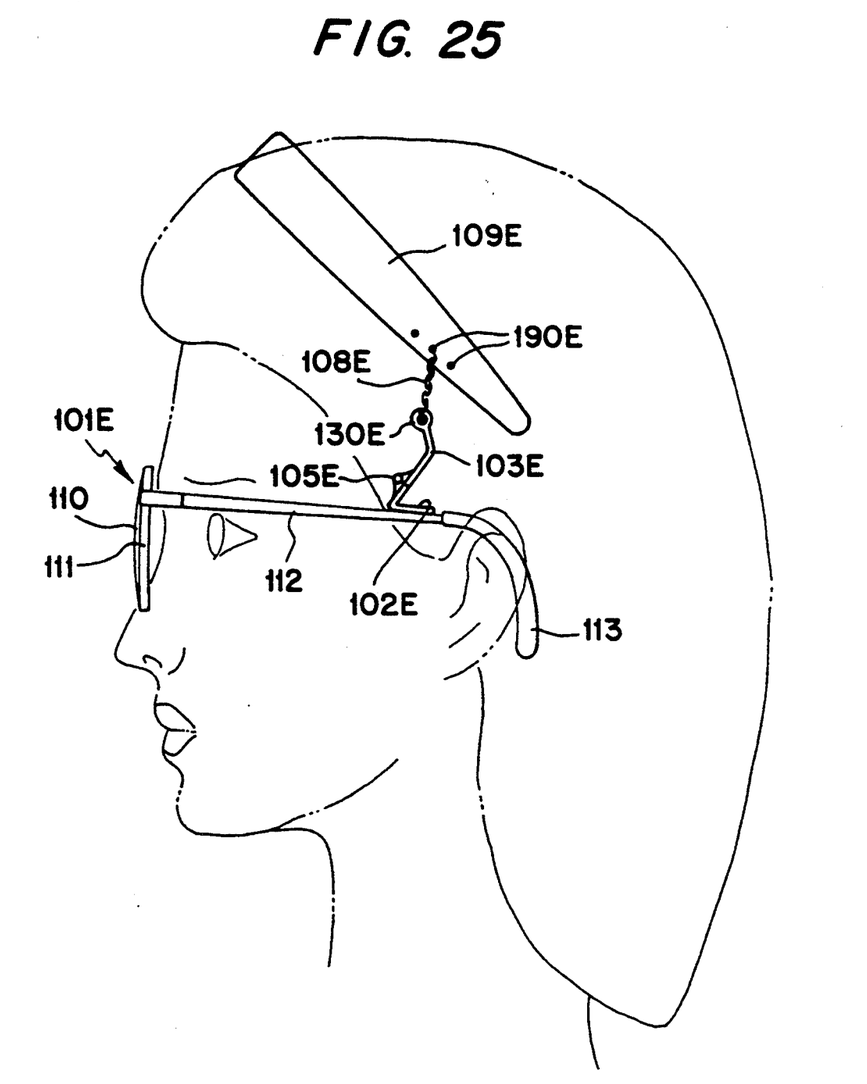

FIGS. 23 to 25 are related to an eye glass frame according to the twelfth embodiment.

Referring to FIGS. 23 to 25, the glass frame according the eleventh embodiment is the same as the tenth embodiment, except that the comb member 107D is replaced with a half circle flexible hair band member 109E. The hair band member 109E has several holes formed in a low in the free ends thereof. The wearer can select one of holes 190E so that the eye glass frame fits exactly to his own head. The eye glass frame according to the twelfth embodiment is preferably used for woman.

I claim:

1. A nose pad-free eye glass frame comprising:
  a pair of rims for receiving lenses;
  a pair of side temples, each having a front end hingedly connected to a respective rim, and a rear end configured for placement over a wearer's ear; and
  a supporting means attached to each of said side temples for holding said rims at a selected distance from the wearer's eyes, each supporting means comprising:
  first and second joint members each having a first end portion connected to a respective side temple adjacent a rear end thereof, and a second end portion extending upwardly from said first end portion, said second end portions disposed generally parallel to one another,
  first and second substantially parallel connecting members connected to respective second end portions and extending upwardly toward a top portion of the wearer's head, and
  head seating means connected to free ends of said connecting members and configured for engagement with the wearer's hair to firmly hold the eye glass frame thereto, and
  first and second hinges pivotably connecting respective connecting members to their associated joint members to enable said connecting members to be pivoted down toward the side temple when not in use.

2. A nose pad-free eye glass frame according to claim 1, wherein each connecting member comprises first and second sections hingedly interconnected so that each connecting member can be compactly folded.

3. A nose pad-free eye glass frame according to claim 2, wherein said first and second sections of each connecting member are hingedly interconnected for relative pivotal movement about an axis oriented generally parallel to said side temple, and each connecting member being pivotable relative to its respective joint member about an axis oriented generally parallel to said side temple.

4. A nose pad-free eye glass frame according to claim 2, wherein said head seating means of each supporting means comprises first and second head seating members connected to respective connecting members.

5. A nose pad-free eye glass frame according to claim 2, wherein said head seating means of each supporting means comprises a single head seating member attached to both of said connecting members.

6. A nose pad-free eye glass frame according to claim 5, wherein said head seating member includes a plate having a plurality of projections oriented perpendicular to the plate and engageable with wearer's hair.

7. A nose pad-free eye glass frame comprising:
  a pair of rims for receiving lenses;
  a pair of side temples, each having a front end hingedly connected to a respective rim, and a rear end configured for placement over a wearer's ear; and
  a supporting means attached to each of said side temples for holding said rims at a selected distance from the wearer's eyes, each supporting means comprising:
  a joint member having a first end portion connected to a respective side temple adjacent a rear end thereof, and a second end portion extending upwardly from said first end portion,
  a connecting member connected to said second end portion and extending upwardly toward a top portion of the wearer's head and branching to form a pair of free ends,
  a pair of head seating members connected to respective ones of said free ends and configured for engagement with the wearer's hair to firmly hold the eye glass frame thereto, and
  a hinge pivotably connecting said connecting member to said second end portion to enable said connecting member to be pivoted down toward the side temple when not in use.

8. A nose pad-free eye glass frame according to claim 7, wherein said hinge defines a pivot axis oriented generally parallel to said side temple.

* * * * *